United States Patent Office 3,663,535
Patented May 16, 1972

3,663,535
4-ACYLOXY-AZETIDINE-2-ONES
Herbert Bestian, Frankfurt am Main, and Dieter Grimm, Wiesbaden, Germany, assignors to Farbwerke Hoechst Aktiengesellschaft vormals Meister Lucius & Bruning, Frankfurt am Main, Germany
No Drawing. Filed Jan. 23, 1970, Ser. No. 5,346
Claims priority, application Germany, Feb. 8, 1969, P 19 06 401.8
Int. Cl. C07d 25/02
U.S. Cl. 260—239 A
9 Claims

ABSTRACT OF THE DISCLOSURE 4-acyloxy-azetidine-2-ones are obtained by reacting vinyl esters with chlorosulfonyl isocyanate. The products are starting compounds for syntheses of compounds containing the β-lactam ring and are useful as acid-yielding agents, especially for printing inks.

---

The present invention relates to new β-lactams, carrying a reactive substituent adjacent to the nitrogen atom. More specifically, it relates to 4-acyloxy-azetidine-2-ones, especially to compounds of the formula

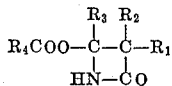

in which $R_1$, $R_2$ and $R_3$ each are hydrogen or lower alkyl, or $R_2$ and $R_3$ together lower alkylene, and $R_4$ is hydrogen or an aliphatic or aromatic hydrocarbon radical of up to 10 carbon atoms each.

A further object of this invention is a process for the preparation of these new compounds, which comprises reacting a vinyl ester of the formula

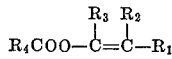

in which $R_1$, $R_2$, $R_3$ and $R_4$ are as defined above, with chlorosulfonyl isocyanate at a temperature of −80 to +50° C. and hydrolyzing the so-obtained β-lactam-N-sulfochloride with an aqueous solution of an acid-binding agent.

Still a further object of this invention is the use of said new β-lactams as acid-yielding agents, e.g. for printing inks and a process for printing of fibrous materials with printing inks containing said compounds.

Still further objects of this invention will appear to anyone skilled in the art from the following disclosure.

It is known that enol ethers react with aryl-sulfonyl-isocyanates to form 4-alkoxy-azetidine-2-ones. The azetidine-2-ones obtained by this method carry an aryl-sulfonyl radical linked to the nitrogen atom, which radical cannot be removed without destroying the azetidinone ring (German Pat. 1,277,258, Chem. Ber. 97, 1576 (1964)). By reacting enol ethers with chlorosulfonyl-isocyanate only open-chain reaction products could be isolated (Chem. Ber. 97, 1576 (1964)).

It has now been found that 4-acyloxy-azetidine-2-ones of the general formula

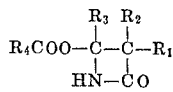

in which $R_1$, $R_2$ and $R_3$ each represents a hydrogen atom or an alkyl group having 1 to 4 carbon atoms, whereby $R_2$ and $R_3$ may be linked to form a ring, and $R_4$ stands for a hydrogen atom, an optionally branched aliphatic or an aromatic hydrocarbon radical having each up to 10 carbon atoms, are obtained by reacting vinyl esters of the general formula

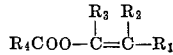

in which $R_1$, $R_2$, $R_3$ and $R_4$ have the above mentioned meanings, with chlorosulfonyl-isocyanate and by hydrolyzing the reaction mixture in the presence of acid-binding agents—preferably in the presence of a salt of an oxygen-containing acid of sulfur having a reducing effect, the salt acting as a catalyst.

The reaction proceeds according to the following scheme:

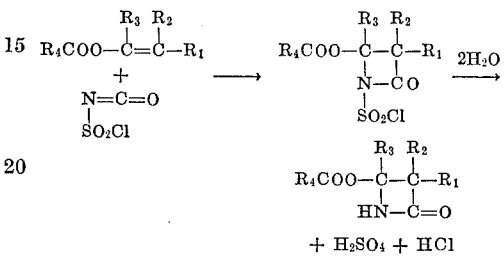

$+ H_2SO_4 + HCl$

The first-formed 4-acyloxy-azetidine-2-one-1 sulfochlorides are very sensitive substances and are generally not isolated, but are subjected to hydrolysis directly after complete reaction.

Examples of vinyl esters which may be used in the process of the invention are: vinyl formate, vinyl acetate, vinyl propionate, vinyl isobutyrate, vinyl pivalate, vinyl benzoate, vinyl naphthoate, vinyl isononanate, propenyl acetate, isobutenyl acetate or 1-acetoxy-cyclohexene-(1).

The reaction may be carried out without solvents or in a solvent inert towards chlorosulfonyl isocyanate, such as methylene chloride, chloroform, diethyl ether or ethyl acetate.

The starting materials can be used in a molar ratio of 1:1, but it is advisable to use the vinyl ester in about 1.1 to 10-fold excess. The reaction can be carried out at temperatures between about −80 and +50° C., preferably between −30 and +20° C.

Hydrolysis is carried out advantageously in the presence of a reducing catalyst, for example sodium sulfite, sodium dithionite or sodium disulfite in quantities of from about 0.01 to 20 mol percent, calculated on the chlorosulfonyl-isocyanate. Saponification is effected at temperatures of, for example, from about −5 to +30° C., and acid-binding agents are added according to the rate of acid set free in the process. The pH range for hydrolysis is from 1 to 12; preferably, the pH value should be kept at 5 to 7. Under especially gentle conditions it is possible to hydrolyze using sodium hydrogen carbonate as acid-binding agent: the quantity equivalent for neutralizing the acid set free is dissolved or suspended in water together with the catalyst and the reaction mixture is introduced into this solution or suspension.

In order to isolate the partly water-soluble 4-acyloxy-azetidine-2-ones, the aqueous saponification solution is extracted advantageously with an organic solvent, such as methylene chloride, chloroform, diethyl ether, ethyl acetate or the vinyl ester used in the reaction. The solvent may be removed from the extract by distillation, optionally in vacuo, in order to separate it from the 4-acyloxy-azetidine-2-one obtained. When the reaction is carried out using an excess of vinyl ester, the unreacted vinyl ester can be used for further reaction after corresponding work-up.

The 4-acyloxy-azetidine-2-ones of the present invention can be submitted to manifold further reactions for reason of their reactive groups in the molecule. They can be used as versatile starting products, for example in the synthesis of medicaments. Thus, susbtances containing the β-lactam ring or the corresponding β-amino acid derivatives are more easily accessible.

The 4-acyloxy-azetidine-2-ones of the present invention are capable of being split with water into carboxylic acids and the corresponding β-lactam-4-ols and are thus acid-yielding agents. These agents are useful as ingredients in printing inks for printing of fibrous materials, e.g. in a manner as set forth in U.S. Pat. No. 3,132,965.

The following examples illustrate the invention; parts and percentages being by weight unless otherwise stated.

EXAMPLE 1

283 g. of chlorosulfonyl isocyanate were added, while stirring, within 10 minutes at $-10°$ C. to 1000 ml. of vinyl acetate, and the mixture was then stirred for 2 hours at $-10°$ C. and for further 3 hours at $-15°$ C.

For saponification, the reaction mixture was introduced, while thoroughly stirring and at a temperature of from $-5$ to $0°$ C., into a suspension of 550 g. of sodium hydrogen carbonate and 25 g. of sodium sulfite in 2 l. of water, and stirring was continued until no carbon dioxide was forming any more. In order to isolate the 4-acetoxy-azetidine-2-one obtained, the vinyl acetate phase was separated and the aqueous phase was extracted 8 times with 500 ml. of vinyl acetate each. The combined vinyl acetate extracts were dryed over sodium sulfate, evaporated in vacuo, and the residue was distilled at a bath temperature of $95°$ C. and at $10^{-3}$ torr over a thin-layer evaporator. The yield of racemic 4-acetoxy-azetidine-2-one was 107 g. (41.5% of the theoretical yield); boiling point of from 80 to $82°$ C./$10^{-3}$ torr (M.P. $34°$ C.).

*Analysis.*—$C_5H_7NO_3$ (129). Calcd. (percent): C, 46.5; H, 5.4; N, 10.8. Found (percent): C, 46.3; H, 5.4; N, 11.0.

EXAMPLE 2

According to the method described in Example 1, 500 g. of vinyl propionate were reacted with 70.7 g. of chlorosulfonyl isocyanate and saponified with 130 g. of sodium hydrogen carbonate and 5 g. of sodium sulfite in 500 ml. of water. After completed saponification the excess vinyl propionate containing already part of the lactam formed was separated and the aqueous phase was extracted 5 times using 100 ml. each of ethyl acetate. The solvents were distilled off in vacuo and the crude product was distilled at $110°$ C. bath temperature over a thin-layer evaporator. The yield of racemic 4-propionyloxy-azetidine-2-one of a boiling point of $107°$ C./$10^{-3}$ torr is 40 g. (57% of the theoretical yield).

*Analysis.*—$C_6H_9NO_3$ (143). Calc. (percent): C, 50.3; H, 6.3; N, 9.8. Found (percent): C, 50.2; H, 6.4; N, 9.9.

EXAMPLE 3

99.1 g. of chlorosulfonyl isocyanate were added to 500 g. of vinyl pivalate at $-5°$ C., and the whole was stirred for 5 hours. The reaction mixture was saponified according to the method of Example 1 with 180 g. of sodium hydrogen carbonate and 5 g. of sodium sulfite in 600 ml. of water and then worked up as described in Example 2. The yield of racemic 4-pivaloyloxy-azetidine-2-one was 78 g. (65% of the theoretical yield); M.P. $62°$ C.

*Analysis.*—$C_8H_{13}NO_3$ (171). Calcd. (percent): C, 56.1; H, 7.6; N, 8.2. Found (percent): C, 56.1; H, 7.7; N, 8.3.

EXAMPLE 4

141.5 g. of chlorosulfonyl isocyanate were added dropwise at $-10°$ C. to 125 g. of vinyl isobutyrate in 100 ml. of methylene chloride and the whole was stirred for 6 hours. The reaction mixture was saponified according to the mehod described in Example 1 with 260 g. of sodium hydrogen carbonate, 12 g. of sodium sulfite and 1 l. of water; the aqueous saponification solution was extracted 4 times with 250 ml. each of methylene chloride and worked up according to Example 2. The yield of racemic 4-isobutyroyloxy-azetidine-2-one of a boiling point of $99°$ C./$10^{-2}$ torr was 49.5 g. (31.5% of the theoretical yield).

*Analysis.*—$C_7H_{11}NO_3$ (157). Calcd. (percent): C, 53.5; H, 7.0; N, 8.9. Found (percent): C, 53.4; H, 7.1; N, 9.1.

EXAMPLE 5

141.5 g. of chlorosulfonyl isocyanate were added dropwise at $-5°$ C. to 296 g. of vinyl benzoate in 300 ml. of diethyl ether and the whole was stirred for 5 hours. Subsequently, the mixture was cooled to $-30°$ C., the sulfochloride formed was suction filtered, the excessive vinyl benzoate removed by washing with a small quantity of ice-cold diethyl ether and then the substance was dryed in vacuo. The yield of racemic 4-benzoyloxy-azetidine-2-one-1-sulfochloride was 215 g. (74% of the theoretical yield); M.P. $85°$ C.

*Analysis.*—$C_{10}H_8ClNO_5S$ (289.5). Calcd. (percent): C, 41.5; H, 2.8; N, 4.8; Cl, 12.3; S, 11.1. Found (percent): C, 41.6; H, 2.8; N, 4.5; Cl, 12.2; S, 11.2.

For saponification, the sulfochloride was introduced into a solution of 200 g. of sodium hydrogen carbonate and 20 g. of sodium sulfite in 1 l. of water and the whole was stirred until no carbon dioxide was forming any more. In order to isolate the 4-benzoyloxy-azetidine-2-one obtained, it was taken up in ethyl acetate, the solvent distilled off in vacuo and the residue recrystallized from di-isopropyl ether. The yield was 98 g. (51% of the theoretical yield); M.P. 93–94° C.

*Analysis.*—$C_{10}H_9NO_3$ (191). Calcd. (percent): C, 62.8; H, 4.7; N, 7.3. Found (percent): C, 62.8; H, 4.7; N, 7.5.

EXAMPLE 6

141.5 g. of chlorosulfonyl isocyanate were added at $0°$ C. to 500 ml. of isobutenyl acetate and the whole was stirred for 2 hours. Saponification was carried out according to the method given in Example 1 and the mixture then worked up according to Example 2 with 260 g. of sodium hydrogen carbonate, 12 g. of sodium sulfite and 1 l. of water. The yield of racemic 4-acetoxy-3,3-dimethyl-azetidine-2-one of a boiling point of 94° C./0.04 torr was 83 g. (55% of the theoretical yield).

*Analysis.*—$C_7H_{11}NO_3$ (157). Calcd. (percent): C, 53.5; H, 7.0; N, 8.9. Found (percent): C, 53.0; H, 7.0; N, 9.1.

EXAMPLE 7

A cotton fabric is printed with a printing paste prepared from:

| | Parts |
|---|---|
| 32% aqueous dispersion of copper phthalocyanine | 50 |
| 30% aqueous solution of a partially saponified graft polymer obtained according to German Pat. 1,094,457 consisting of 26% polyethylene glycol, 26% vinyl acetate and 48% vinyl alcohol units in the macromolecule, K-value=45 | 200 |
| 80% aqueous dispersion of dimethylol urea, etherified per 1 mol pre-condensate with 1 mol methanol and 1 mol butanediol-1,4 | 80 |
| Oil-in-water emulsion having the composition given hereunder | 650 |
| 33% aqueous solution of 4-acetoxy-azetidine-2-one | 20 |
| | 1000 |

The oil-in-water emulsion is obtained by emulsifying into a solution prepared from:

| | Parts |
|---|---|
| Reaction product of 13 mols ethylene oxide with 1 mol tri-isobutylphenol | 3 |
| in | |
| Water | 147 |
| Heavy petrol boiling at temperatures between 180° and 230° C. | 850 |
| | 1000 |

Subsequently, the print is fixed for 5 minutes by dry heating to 150° C. A brilliant blue print having good fastness properties is obtained.

We claim:
1. A compound of the formula

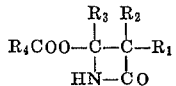

in which $R_1$, $R_2$ and $R_3$ each are hydrogen or lower alkyl or $R_2$ and $R_3$ together are lower alkylene, and $R_4$ is hydrogen, alkyl of up to 10 carbon atoms, phenyl or naphthyl.

2. The compound as claimed in claim 1, wherein $R_1$, $R_2$ and $R_3$ each are hydrogen or methyl and $R_4$ is hydrogen, lower alkyl or phenyl.

3. The compound as claimed in claim 1, wherein $R_1$, $R_2$ and $R_3$ each are hydrogen and $R_4$ is lower alkyl or phenyl.

4. The compound as claimed in claim 1, wherein $R_1$, $R_2$ and $R_3$ are hydrogen and $R_4$ is methyl.

5. The compound as claimed in claim 1, wherein $R_1$, $R_2$ and $R_3$ are hydrogen and $R_4$ is ethyl.

6. The compound as claimed in claim 1, wherein $R_1$, $R_2$ and $R_3$ are hydrogen and $R_4$ is phenyl.

7. The compound as claimed in claim 1, wherein $R_1$, $R_2$ and $R_4$ are methyl and $R_3$ is hydrogen.

8. The compound as defined in claim 1, wherein $R_1$, $R_2$ and $R_3$ each are hydrogen or methyl and $R_4$ is tertiary butyl.

9. The compound as defined in claim 1, wherein $R_1$, $R_2$ and $R_3$ each are hydrogen and $R_4$ is iso-propyl.

References Cited

UNITED STATES PATENTS 3,076,800    2/1963    Graf _____ 260—239

ALTON D. ROLLINS, Primary Examiner

U.S. Cl. X.R.

8—87